(12) United States Patent
Wicks et al.

(10) Patent No.: US 6,262,328 B1
(45) Date of Patent: Jul. 17, 2001

(54) CONTAINER AND METHOD FOR ABSORBING AND REDUCING HYDROGEN CONCENTRATION

(75) Inventors: George G. Wicks, Aiken; Myung W. Lee, North Augusta; Leung K. Heung, Aiken, all of SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/330,686

(22) Filed: Jun. 11, 1999

(51) Int. Cl.[7] .................................................. G21F 9/02
(52) U.S. Cl. ................................................ 588/1; 429/71
(58) Field of Search ............................... 96/4, 108, 134, 96/139; 55/385.4; 588/1; 424/71, 82, 83

(56) References Cited

U.S. PATENT DOCUMENTS

| | | |
|---|---|---|
| 4,036,944 | 7/1977 | Blytas . |
| 4,051,226 | 9/1977 | Staudinger et al. . |
| 4,797,249 | 1/1989 | Schweiger . |
| 4,957,518 * | 9/1990 | Brassell ........................ 96/4 |
| 4,957,522 * | 9/1990 | Brassell ........................ 96/4 |
| 5,047,348 * | 9/1991 | Stinson ................... 55/385.4 X |
| 5,193,709 * | 3/1993 | Brassell . |
| 5,612,150 | 3/1997 | Nishimura et al. . |
| 5,624,598 | 4/1997 | Shepodd et al. . |
| 5,645,382 | 7/1997 | Homanick et al. . |
| 5,660,587 | 8/1997 | Baer . |
| 5,891,223 * | 4/1999 | Shaw et al. ..................... 96/134 |

* cited by examiner

Primary Examiner—Harold Joyce
(74) Attorney, Agent, or Firm—Dority & Manning, PA

(57) ABSTRACT

A method for absorbing hydrogen from an enclosed environment comprising providing a vessel; providing a hydrogen storage composition in communication with a vessel, the hydrogen storage composition further comprising a matrix defining a pore size which permits the passage of hydrogen gas while blocking the passage of gaseous poisons; placing a material within the vessel, the material evolving hydrogen gas; sealing the vessel; and absorbing the hydrogen gas released into the vessel by the hydrogen storage composition. A container for absorbing evolved hydrogen gas comprising: a vessel having an interior and adapted for receiving materials which release hydrogen gas; a hydrogen absorbing composition in communication with the interior, the composition defining a matrix surrounding a hydrogen absorber, the matrix permitting the passage of hydrogen gas while excluding gaseous poisons; wherein, when the vessel is sealed, hydrogen gas, which is released into the vessel interior, is absorbed by the hydrogen absorbing composition.

21 Claims, 2 Drawing Sheets

CONTAINER AND METHOD FOR ABSORBING AND REDUCING HYDROGEN CONCENTRATION

The present invention relates to hydrogen absorption. More particularly, the present invention relates to using compositions for absorbing or storing hydrogen within sealed vessels. The United States Government has rights in this invention pursuant to Contract No. DE-AC09-96SR18500 between the U.S. Department of Energy and Westinghouse Savannah River Company.

FIELD OF THE INVENTION

DISCUSSION OF BACKGROUND

Hydrogen accumulation is a major concern in various industrial applications and processes. Hydrogen gas is highly flammable and is often generated or evolved as a by-product or waste emission. A hydrogen explosion can take place if the hydrogen concentration is allowed to exceed four (4%) percent. Furthermore, accumulations of hydrogen gas can present over-pressurization problems in sealed containers along with the attendant hazards of explosion and fire.

For instance, in U.S. Pat. No. 5,660,587 to Baer, which is incorporated herein by reference, a passive ventilation system and method for venting hydrogen from a chamber housing a battery is shown. As described in Baer, battery charging in remote cabinets, office building and electric vehicles has resulted in numerous explosions that destroy the battery and its container and possibly injure people. These explosions are frequently caused by igniting hydrogen gas in insufficiently ventilated battery chambers.

When batteries are overcharged, the current in the cell produces hydrogen. To avoid the accumulation of hydrogen in the battery, battery chambers are typically vented to release the hydrogen to the environment. The invention of Baer is directed to allow ventilation only when there is an increase of hydrogen concentration in the battery chamber. The invention however, does not address the removal of hydrogen from the environment to which it is vented.

As discussed in U.S. Pat. No. 5,624,598 to Shepodd, the operating life of a lamp, either incandescent or pressurized discharge lamps, can be greatly affected by the presence of certain gases in the internal lamp atmosphere. Water vapor is particularly harmful. In an incandescent lamp, for example, the temperature of the tungsten coil is sufficient to decompose water vapor into hydrogen and oxygen. Removal of the hydrogen is key in prolonging the useful life of the lamp. Shepodd seeks to solve this problem by disclosing hydrogen getters which are useful only at elevated temperatures.

In the nuclear industry, there is often a need to store and ship waste consisting of Pu-238 and high activity fraction of Pu-239. However, as a result of radiolysis, hydrogen gas is generated. The evolved gas poses an over-pressurization concern during storage, transportation and the ultimate disposal of the waste. Presently, waste consisting of Pu-238 and high activity fraction of Pu-239 cannot be shipped to long term storage areas, because of the hydrogen gas pressurization concerns of the storage containers. Thus, there remains a need in the industry for a method and container for reducing the concentration of hydrogen gas in a waste container consisting of Pu-238 and high activity fraction of Pu-239.

Various metals and metal alloys can absorb and then desorb large amounts of hydrogen under appropriate temperature and pressure conditions. These materials are referred to as metal hydrides and are well known in the art. They include pure metals such as Mg, Pd, Ti, Pt, U, and alloys such as those based on nickel, lanthanum and aluminum.

U.S. patent application Ser. No. 09/094,293, filed on Jun. 9, 1998 by the Applicant, and incorporated herein by reference, discloses a sol made from tetraethyl orthosiliate, ethanol, water and hydrochloric acid mixed with a hydrogen-absorbing metal alloy and solidified to form a porous glass matrix with the hydrogen absorbing alloy dispersed uniformly throughout the matrix to form a composite useful in the present invention. The composite is aged and subsequently heat treated to obtain a porosity that allows the hydrogen to react with the metal alloy to form a metal hydride, excluding poisonous CO and $H_2S$ from the metal alloy. The metal alloy encapsulated in the porous matrix is, thus, protected from the hydride poisons present in the environment, e.g. a gaseous stream.

The composition used in the present invention is immune to gaseous poisons and is ideally suited for hydrogen absorption from environments where mixtures of various gases may be present.

SUMMARY OF THE INVENTION

According to its major aspects and broadly stated, this invention is directed to a container and method for reducing the concentration of accumulated hydrogen from the interior of a sealable container. The container comprises a material suitable for the product or method to be accommodated. In a preferred embodiment, the container comprises a hydrogen absorber. Additionally, in an alternative embodiment, the container comprises a vent or exhaust port in communication with the hydrogen absorber so that, while hydrogen gas is removed from the container exhaust, other gases or by-product are released to the environment minus the hydrogen gas. One skilled in the art will appreciate that there are instances when venting the contents of a container is feasible upon removal of the hydrogen gas. In such instances, the hydrogen absorber used in this invention is not affected by the presence of other gases which may poison the hydrogen absorber.

A general method of practicing the invention comprises the steps of providing a container, placing a hydrogen absorber into the container, sealing the container and removing evolved hydrogen gas from the container contents by the hydrogen absorber.

The hydrogen absorption composition preferably used in this present invention is described in U.S. patent application Ser. No. 09/094,293, incorporated herein by reference, and describes a formulation of a glass matrix in which the pore size has a high degree of uniformity. In particular, the pore size permits the free passage of hydrogen gas to occur, while excluding certain other gaseous molecules such as metal hydride poisons $H_2S$ and CO. The glass matrix is extremely porous and has a very high surface area-to-volume ratio. It is chemically and physically stable and holds the hydride particles securely. Thus, it enables the absorption of large amounts of hydrogen by the hydride over repeated cycles of use while the matrix physically excludes gaseous poisons.

In a first embodiment of the present invention, the described hydrogen absorption composition is contained within a closed container seen as a 55 gallon waste drum. The container contains substances which release hydrogen as a gaseous by-product. Because the container is sealed, there is a need to remove hydrogen in order to preclude a build up of excessive pressure or explosive $H_2$ concentrations within the container. The hydrogen absorber is able to absorb the hydrogen gas without being affected by other gases which act as poisons.

In a second embodiment of the invention, the hydrogen absorber is placed within sealed battery systems or in areas housing large battery systems. In a closed battery system, there would be a similar need to remove a build up of hydrogen gas which could cause an over-pressurization or accumulation of dangerous $H_2$ levels within the system. In a room or containment area housing battery systems, there is a need to remove hydrogen gas from the environment in order to avoid fire or explosion hazards. The hydrogen absorber, in either situation, is capable of removing the hydrogen without being adversely affected by other gases that may also be present.

One particular use of the invention is with sealed battery systems related to battery-operated emergency lighting. Such lighting systems are designed to turn on in the event of a power failure to provide lighting in critical areas such as stairwells, exits, and areas of potential hazards. Such systems typically employ a battery-operated power supply which is continuously recharged. The recharging process normally produces small quantities of hydrogen gas. The present composition can be added to the sealed battery compartment to avoid overpressurization and hydrogen gas accumulations.

It is an object of the present invention to provide a method for absorbing hydrogen in a closed environment.

It is another object of the present invention to provide a container for absorbing evolved hydrogen gas emissions.

It is a further object of the present invention to provide a method for absorbing hydrogen from within a sealed container system to alleviate over pressurization hazards.

It is yet a further object of the present invention to provide a method for reducing the hydrogen gas concentration in an open container system to avoid the accumulation of explosive amounts of hydrogen gas.

Other uses, features and advantages of the invention will be apparent to those skilled in the art from a careful reading of the Detailed Description of Preferred Embodiments presented below.

DETAILED DESCRIPTION OF A PREFERRED EMBODIMENT

Figure 1:
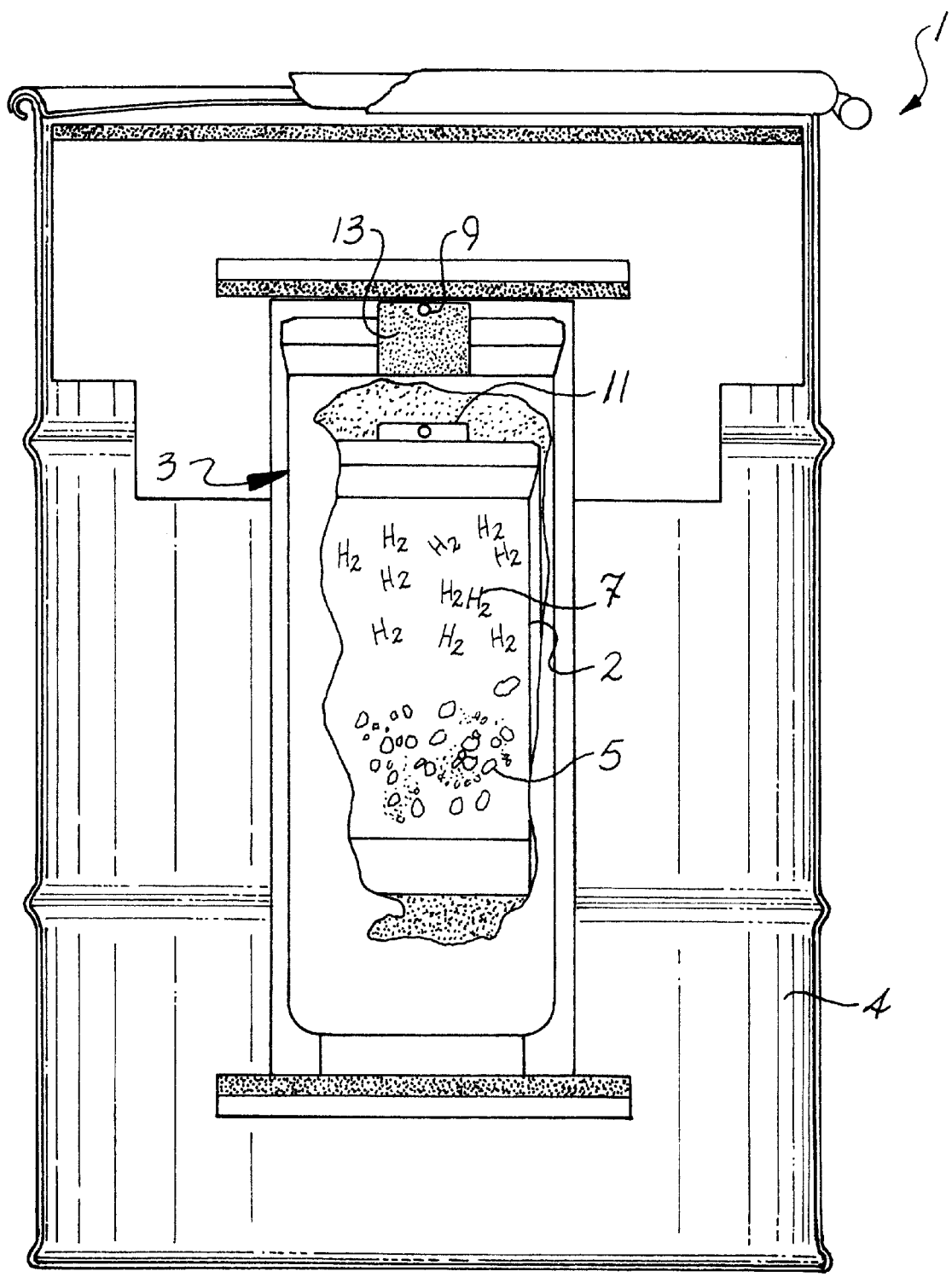
FIG. 1 is a sectional view of a 55 gallon waste drum which illustrates a first embodiment of the present invention.

In accordance with the present invention, it has been found that a hydrogen absorbing composition may be used in a container or any other environment in which hydrogen gas is produced or is present.

The hydrogen-absorbing composition disclosed in U.S. patent application Ser. No. 09/094,293 and incorporated herein by reference, is prepared by a method generally as follows. A first solution (solution A) is prepared by mixing an alcohol such as ethanol and water at a ratio of 1 part ethanol to 2.7 parts water by volume. Drops of hydrochloric acid are added to the solution to reach a pH value of 1.6. A second solution (solution B) is prepared by mixing alcohol (ethanol) and tetraethyl orthosilicate (TEOS) at a ratio of 1 part ethanol to 2 parts TEOS by volume.

Solution A is slowly added to solution B with continuous mixing. The combined solutions are continuously mixed for about 30 minutes until a sol is achieved.

To the sol solution, metal particles are added which have been prepared as follows. A metal alloy, such a $LaNi0.25Al0.75$ or other metal hydride is repeatedly reacted with hydrogen in a cyclic process which results in the production of a metal hydride fines. The desired alloy fines have a particle size of less than 45 microns. The fines/particles are slowly exposed to air and surface oxidized until a thin layer of metal oxide has slowly formed on the surfaces of the metal fines. The surface oxidation prevents further oxidation of the inner portions of the metal particles. The oxidation is done at a slow, controlled rate to prevent the entire particle from becoming oxidized which renders the material useless for hydrogen absorption. Once the controlled oxidation has occurred, the metal particles are stable in the presence of air and can be easily handled for use in the composition of the present invention.

The metal hydride particles described and prepared above, are added to the sol at a ratio of about 20 grams of metal to 240 cc of sol. The mixture is placed on a rotating mixer which maintains the metal particles in a suspension within the sol. The mixing continues for about 24 hours until the sol has solidified.

The solidified sol-gel with the dispersed metal hydride particles is removed from the mixer and placed in a sealed container for about 10 days. During the 10 day seasoning time, a liquid phase gradually appears. Following seasoning, the seal is removed and the liquid is allowed to evaporate at room temperature.

Following evaporation of the liquid phase, the remaining solid product is vacuum dried at ambient temperature to remove any residual volatile compounds. While under vacuum, the temperature is increased to 300° C. over a 30 minute time interval (curing) which is maintained along with the negative pressure for two hours. The heat treated material, hereinafter "composite", is allowed to cool to room temperature. Following cooling, the composite is mechanically broken to a useful size range of final product which is between 20 to 8 mesh (0.5 to 1 mm particle size). The final product can then be used in a conventional gas separation column or apparatus to remove hydrogen gas from a gas stream.

The composite provided above is particularly useful for absorbing hydrogen from gas streams which contain known metal hydride gaseous poisons. These metal hydride poisons have no effect on the composition's ability to absorb hydrogen.

With regard to the present invention, as seen in FIG. 1, a closed container 1, seen here as a waste drum, is provided containing a material 5 which produces hydrogen gas emissions 7. In a first embodiment, the container 1 is used to store waste comprising Pu-238 and high activity fraction of Pu-239. As a result of a radiolysis reaction, hydrogen gas is produced, creating an over pressurization and explosion concern during the transportation and long-term storage of the waste.

In a first embodiment of the invention, the container 1 comprises various layers for protection, including a primary containment vessel 2 which holds the stored waste. At the upper portion of the primary containment vessel 2 is a vent structure 11 which allows the hydrogen gas 7 to escape from the primary containment vessel 2 to the secondary containment vessel 3.

The secondary containment vessel 3 also comprises a secondary vent system 9 which vents to an outer containment area 4. The secondary vent system 9, however, is in communication with a hydrogen absorbing composition 13. The hydrogen absorbing composition 13 removes the hydrogen gas 7 from the container 1 environment, thus, eliminating the danger of over-pressurization and the build-up of dangerous hydrogen gas concentrations. The hydrogen absorbing composition 13 continues to remove hydrogen gas 7 from the container 1 even in the presence of gases that are poisonous to the hydrogen absorber.

The present invention is not limited to a sealed or vented container, however. In a second embodiment of the invention, the hydrogen absorber is used in conjunction with a chamber housing a battery or battery systems which emit hydrogen gas.

Battery systems generate hydrogen gas emissions such that the danger of a build up of hydrogen gas emissions is a concern. If the system is a vented system, then the concentration of hydrogen gas in the environment to which the system is vented must be controlled. If the system is a closed system, $H_2$ build-up or over-pressurization of the system must be avoided.

Figure 2:
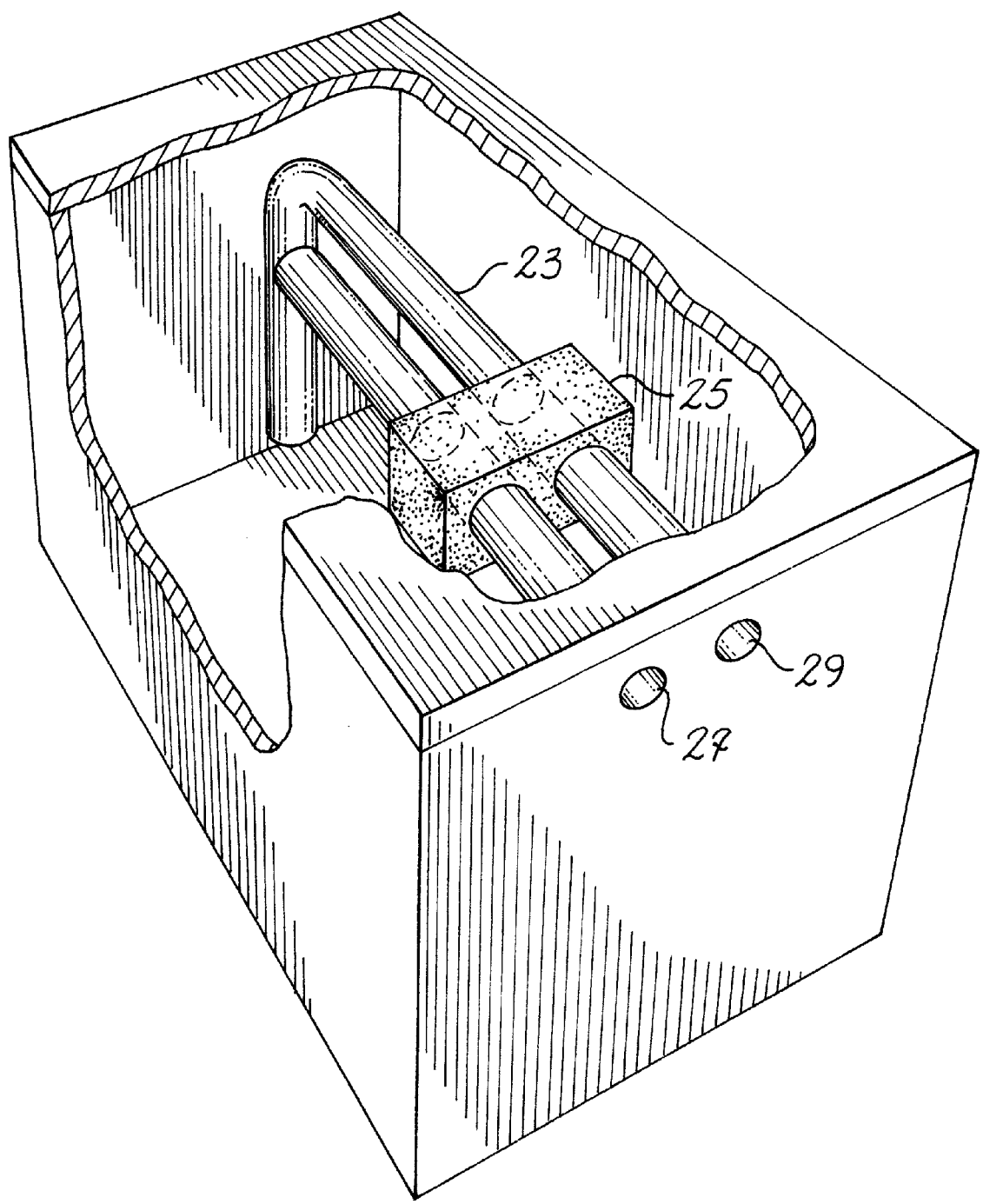
FIG. 2 is a perspective view in partial section of a battery housing containing an optional vent system.

As seen in FIG. 2, a housing 21 for a battery system is provided. The housing 21 comprises a vent system 23 having at least one venting route. In the second embodiment, two venting routes are provided 27 and 29. The presence of the two venting routes allows sufficient quantities of hydrogen gas to be carried out of the housing 21 and also allows outside air to be brought in. The vent system 23 is in communication with a hydrogen absorber 25 which removes the hydrogen gas from the housing environment prior to releasing the air to the outside environment. Hydrogen absorber 25 may be placed within the actual exhaust vent 27. Alternatively, hydrogen absorber 25 may be placed anywhere within the interior of housing 21 where it would be operative to remove hydrogen gas and thereby maintain a hydrogen gas concentration below a critical threshold value.

In instances where the exhausting of hydrogen gas buildup from the battery housing 21 into the surrounding environment is not feasible, the venting routes 27 and 29 may be removed or sealed to provide a sealed container environment.

The hydrogen storage composition can be molded to any desired shape or size. The composition is useful within any sealed environment where released hydrogen gas may create pressurization problems or accumulate to explosive concentrations. As discussed above, specific embodiments of the present invention are discussed in terms of a shipping and storage container for radioactive waste and an external housing for a battery. However, any sealed container, broadly defined herein to include a room, compartment, container, package, sealed vessel, or similar environment, may be useful in the present invention.

The present hydrogen storage composition is also useful for providing a system for preventing dangerous concentrations of hydrogen gas from accumulating in poorly ventilated environments as well. For instance, battery compartments associated with electric vehicles or electrical generation and storage may benefit from the inclusion of the hydrogen storage composition. Such compartments have an inherent risk associated with hydrogen gas generation and release. The use of a hydrogen storage composition in the compartments will provide an additional safeguard against excessive hydrogen gas accumulation.

It is also envisioned that the present hydrogen storage composition may be useful in some situations where hydrogen getters are used. For instance, inside a sealed incandescent lamp bulb, the hydrogen absorber composition may be provided within the bulb interior to remove evolved hydrogen and thereby prolong the useful life of the lamp.

Additional applications of the present invention include providing a sealed protective enclosure around possible ignition sources of hydrogen prone environments. For instance, traditional ventilation techniques for battery rooms or other environments where hydrogen gas accumulations may occur, can be supplemented with enclosures, the enclosures having hydrogen absorbing materials therein. The enclosures are used to provide a sealed housing for light switches, electrical equipment, lighting sources and other spark or ignition sources. In this manner, possible ignition sources are sealed against hydrogen infiltration and accumulation.

Upon reading the above detailed description, it will be apparent to those skilled in the art that many changes and substitutions can be made to the preferred embodiment herein described without departing from the spirit and scope of the present invention as defined by the appended claims.

What is claimed is:

1. A method for absorbing hydrogen from an enclosed environment comprising:

providing a vessel;

providing a hydrogen storage composition in communication with said vessel, said hydrogen storage composition further comprising a matrix defining a pore size which permits the passage of hydrogen gas while blocking the passage of gaseous poisons;

placing a material within said vessel, said material providing a source of hydrogen gas emissions; and absorbing said hydrogen gas emissions by said hydrogen storage composition.

2. The method according to claim 1 comprising the additional step of sealing said vessel.

3. A method for absorbing hydrogen according to claim 1 wherein the step of providing a hydrogen storage composition further comprises providing a vent structure comprising said storage composition, said vent structure allowing communication between an interior and an exterior of said vessel.

4. A method of absorbing hydrogen according to claim 3 wherein said vent is sealable.

5. A method for absorbing hydrogen according to claim 1 wherein said vessel is a waste drum.

6. A method for absorbing hydrogen according to claim 1 wherein said vessel is a housing for an automotive battery.

7. A method for absorbing hydrogen according to claim 1 wherein said vessel comprises a light fixture.

8. A method for absorbing hydrogen according to claim 1 wherein said vessel is a room.

9. A method for absorbing hydrogen according to claim 1 wherein said gaseous poisons include CO or $H_2S$.

10. A method for absorbing hydrogen according to claim 1 wherein said material within said vessel is a plurality of batteries.

11. A method for absorbing hydrogen according to claim 1 wherein said material within said vessel further houses a process which releases hydrogen gas.

12. A container for absorbing hydrogen gas comprising:

a vessel having an interior and adapted for receiving materials which release hydrogen gas;

a hydrogen absorbing composition disposed within the vessel, the composition defining a matrix surrounding a hydrogen absorber, the matrix permitting the passage of hydrogen gas while excluding gaseous poisons;

wherein, when the vessel is sealed, hydrogen gas, which is released into the vessel interior, is absorbed by the hydrogen absorbing composition.

13. A container for absorbing evolved hydrogen gas according to claim 12 wherein the vessel further comprises a vent for releasing gaseous build-up after the hydrogen gas is removed by the hydrogen absorber.

14. A container for absorbing evolved hydrogen gas according to claim 13 wherein the vent is sealable.

15. A container for absorbing evolved hydrogen gas according to claim 12 wherein the vessel is a waste drum.

16. A container for absorbing evolved hydrogen gas according to claim 12 wherein the vessel is a housing for a battery.

17. A container for absorbing evolved hydrogen gas according to claim 12 wherein the vessel is a light fixture.

18. A container for absorbing evolved hydrogen gas according to claim 12 wherein the vessel is a battery room.

19. A container for absorbing evolved hydrogen gas according to claim 12 wherein the gaseous poisons include CO or $H_2S$.

20. A container for absorbing evolved hydrogen gas according to claim 12 wherein said material within the vessel is a plurality of batteries.

21. A container for absorbing evolved hydrogen gas according to claim 12 wherein the interior is used to carry out a process which emits hydrogen gas.

* * * * *